United States Patent
Noro et al.

(10) Patent No.: US 7,138,772 B2
(45) Date of Patent: Nov. 21, 2006

(54) ELECTRICALLY MOVABLE VEHICLE AND CONTROL PROGRAM FOR DRIVING ELECTRICALLY MOVABLE VEHICLE

(75) Inventors: Takuya Noro, Kusatsu (JP); Takayoshi Akagi, Otsu (JP)

(73) Assignee: Sanyo Electric Co. Ltd., Osaka (JP)

( * ) Notice: Subject to any disclaimer, the term of this patent is extended or adjusted under 35 U.S.C. 154(b) by 0 days.

(21) Appl. No.: 11/237,669

(22) Filed: Sep. 29, 2005

(65) Prior Publication Data

US 2006/0066268 A1    Mar. 30, 2006

(30) Foreign Application Priority Data

Sep. 30, 2004    (JP) .............................. 2004-289252

(51) Int. Cl.
 *H02P 5/46* (2006.01)
(52) U.S. Cl. .............................. 318/69; 318/68; 318/59; 318/66; 318/254; 318/138; 318/772; 318/779; 318/799; 318/823; 388/800
(58) Field of Classification Search .................. 318/69, 318/68, 66, 254, 138, 772, 799, 823; 180/6.28; 388/800
See application file for complete search history.

(56) References Cited

U.S. PATENT DOCUMENTS 6,615,937 B1 * 9/2003 Richey et al. ............... 180/6.5
6,988,570 B1 * 1/2006 Takeuchi ..................... 180/6.48
2001/0006125 A1 * 7/2001 Richey et al. ............... 180/6.5
2002/0011361 A1 * 1/2002 Richey et al. ............... 180/6.5

FOREIGN PATENT DOCUMENTS

JP    2001-104396    4/2001

* cited by examiner

Primary Examiner—Rita Leykin
(74) Attorney, Agent, or Firm—Westerman, Hattori, Daniels & Adrian, LLP.

(57) ABSTRACT

The invention provides an electrically movable vehicle drivable by a simplified mode of control and a control program for driving the vehicle. A normalized value Y' representing translation motion and a normalized value X' representing turning motion are fed from a command value input unit 110 to a velocity command value calculating unit 120. The calculating unit 120 determines a translation velocity command value $V_{g\_trg}$ based on the normalized value Y'. The calculating unit 120 determines a turn angular velocity command value $\omega_{f\_trg}$ that will always satisfy Expression (2–4) for preventing the vehicle from falling down. The translation velocity command value $V_{g\_trg}$ and the turn angular velocity command value $\omega_{f\_trg}$ determined by the unit 120 are fed to a control command value calculating unit 130, which calculates control command values for left and right drive wheels. The control command values are fed to a motor control unit 140 to control motors Mr, Ml and control the drive wheels.

19 Claims, 8 Drawing Sheets

ELECTRICALLY MOVABLE VEHICLE AND CONTROL PROGRAM FOR DRIVING ELECTRICALLY MOVABLE VEHICLE

FIELD OF THE INVENTION

The present invention relates to electrically movable vehicles which can be manipulated, for example, by the rider for controlling the motion of the vehicle using direction command means and to control programs for driving the electrically movable vehicle.

BACKGROUND OF THE INVENTION

Maneuverability is important with electrically movable vehicles such as wheelchairs. Accordingly, techniques are disclosed as to electrically movable vehicles which realize maneuverability approximate to turning as imaged by the user (see, for example, the publication of JP-A No. 2001-104396, page 1). The electrically movable vehicle disclosed in the patent literature is driven by controlling the operation of a first motor for driving the right wheel and a second motor for driving the left wheel by a controller according to the manipulation of a joystick lever. Stated more specifically, use is made of the angle of inclination of the joystick lever and the direction of inclination of the lever as input data as to the state of the lever as inclined by the manipulator toward the direction of turning. The controller calculates the distance from the current position to a forward target point to be moved past by turning. If the target point is far, the motors are so controlled as to turn the vehicle with a radius greater than when the target point is near. If the target point is near, the motors are so controlled as to move the vehicle to move pat the neighborhood of the current position and the target point.

As disclosed in the above patent literature, it is common practice to control the operation of the left and right wheels individually to turn the vehicle. With the vehicle disclosed in the patent literature, the target values for driving the left and right wheels are defined in terms of distances to be run to reach the target points of the respective wheels. For the vehicle to turn in this case, translating motion is required. In the mode of control disclosed in the patent literature, therefore, it is impossible to turn the vehicle in situ without involving translation.

In the above patent literature, the target value for the drive wheel is finally provided with consideration given to a force (so called lateral G) due to gravity eventually acting on the drive wheel horizontally of the vehicle, spin velocity and limit to the rotational speed of the wheel. In this case, a control value is determined by comparing a value calculated from conditions involving lateral G, spin velocity and limit to the rotational speed of the wheel so as not to exceed these conditions, with a value calculated from the input command value and judging the result of comparison. Accordingly, the control program becomes complex in structure due to increased number of condition judging steps and a specific processing procedure required for the value of the command input unit.

An object of the prevent invention, which has been accomplished in view of the above problem, is to provide an electrically movable vehicle which can be driven by a simplified mode of control and a control program for driving the vehicle.

SUMMARY OF THE INVENTION

To overcome the above problem, the present invention provides an electrically movable vehicle having wheel drive means for driving left and right wheels of the vehicle independently of each other, a command value input unit for obtaining a command value for performing translation motion and turning motion of the vehicle, a velocity command value calculating unit for calculating a translation velocity command value and a turn angular velocity command value at the center of gravity of the vehicle based on the command value obtained by the input unit, and a control command value calculating unit for calculating control values for controlling the wheel drive means for the left and right wheels in corresponding relation with the translation velocity command value and the turn angular velocity command value calculated by the velocity command value calculating unit. The vehicle is characterized in that the velocity command value calculating unit determines one of the velocity command value for the translation of the vehicle and the velocity command value for the turning motion thereof from the command value obtained by the input unit, and calculates and determines the other velocity command value from a detected velocity corresponding to the velocity command value determined.

According to the invention, the velocity command value calculating unit determines one of the velocity command value for the translation of the vehicle and the velocity command value for the turning motion thereof from the command value obtained by the input unit. The velocity command value calculating unit calculates and determines the other velocity command value from a detected velocity corresponding to the velocity command value determined. Thus, after one of the velocity command values has been determined, the velocity command value for the other motion is determined so as to satisfy the stabilizing condition. Accordingly, a translation velocity command value and a turning motion velocity command value can be determined efficiently which will satisfy the stabilizing condition, for example, for preventing the vehicle from falling down due to a centrifugal force. This realizes the control of the vehicle with a simplified program unlike the case wherein judgment is made as to whether the stabilizing condition can be satisfied after the two motion velocities have been determined.

It is also possible for the velocity command value calculating unit to determine the velocity command value for the translation from a command value concerning the translation and obtained by the input unit and to determine the velocity command value for the turning motion from a command value concerning the turning motion and obtained by the input unit and from a detected velocity of the translation. Thus, the velocity command value calculating unit determines the velocity command value for the translation from a command value concerning the translation and obtained by the input unit. The calculating unit determines the velocity command value for the turning motion from a command value concerning the turning motion and obtained by the input unit and from a detected velocity of the translation. The velocity command value calculating unit determines the turning motion velocity command value based on the velocity command value for the turning motion and the detected velocity of translation motion. Accordingly, the velocity command value for the turning motion is determined according to the detected velocity of translation motion so as to satisfy the stabilizing condition. On the other hand, the velocity command value for the translation motion is determined in corresponding relation with the command value, so that the vehicle can be assured of properties to advance straight preferentially. This gives improved mobility to the vehicle mainly when the vehicle performs translation motion as when traveling outdoors.

It is also possible for the velocity command value calculating unit to determine the velocity command value for the turning motion from a command value concerning the turning motion and obtained by the input unit and to determine the velocity command value for the translation from a command value concerning the translation and obtained by the input unit and from a detected velocity of the turning motion.

Thus, the velocity command value calculating unit determines the velocity command value for the turning motion from a command value concerning the turning motion and obtained by the input unit. The calculating unit determines the velocity command value for the translation from a command value concerning the translation and obtained by the input unit and from a detected velocity of the turning motion. Accordingly, the velocity command value for the translation motion is determined according to the detected velocity of turning motion so as to satisfy the stabilizing condition. On the other hand, the velocity command value for the turning motion is determined in corresponding relation with the command value, so that the vehicle can be assured of turnability preferentially. This gives improved mobility to the vehicle when the vehicle needs to turn quickly as when traveling indoors.

The electrically movable vehicle can be provided with a changeover unit, the velocity command value calculating unit being operable in response to a signal from the changeover unit to practice a first mode of control to determine the velocity command value for the translation motion from a command value concerning translation motion and obtained by the command value input unit and to determine the velocity command value for the turning motion from a command value concerning the turning motion and obtained by the command value input unit and a detected velocity of the translation motion, or to practice a second mode of control to determine the velocity command value for the turning motion from a command value concerning the turning motion and obtained by the command value input unit and to determine the velocity command value for the translation motion from a command value concerning the translation motion and obtained by the command value input unit and a detected velocity of the turning motion.

Thus, in response to a signal from the changeover unit, the velocity command value calculating unit practices a first mode of control or a second mode of control upon a changeover. The first mode of control determines the velocity command value for the translation motion from a command value concerning translation motion and obtained by the command value input unit and determines the velocity command value for the turning motion from a command value concerning the turning motion and obtained by the command value input unit and a detected velocity of the translation motion. The second mode of control determines the velocity command value for the turning motion from a command value concerning the turning motion and obtained by the command value input unit and determines the velocity command value for the translation motion from a command value concerning the translation motion and obtained by the command value input unit and a detected velocity of the turning motion. One of the two modes of control can therefore be practiced upon a changeover changed over depending on the situation, e.g., depending on whether the properties of the vehicle to advance straight is to be assured preferentially or the quick turnability of the vehicle is to be ensured preferentially. This renders the vehicle more convenient to use.

The electrically movable vehicle of the invention can be provided with a lag element for receiving as an input the command value output from the command value input unit and outputting a command value to the velocity command value calculating unit.

Thus, the vehicle has a lag element for receiving the command value output from the command value input unit and outputting a command value to the velocity command value calculating unit. More specifically, a lag element is interposed between the command input unit and the velocity command value calculating unit so as to delay the command value to be input to the calculating unit, relative to variations in the command value output from the command input unit. Even if the command value delivered from the command input unit varies abruptly or markedly, a gentle command value is input to the command value calculating unit. Consequently, the velocity command value calculating unit calculates translation velocity command values and turning motion velocity command values based on gently varying command values, and the wheel drive means is controlled accordingly. As a result, even if the command given by the input unit involves disturbances, the vehicle is smoothly movable and allowed to travel with improved stability.

The vehicle drive means is adapted to reversibly control the rotation of the left and right wheels with command values which are different in polarity.

Thus, the rotation of the wheels is reversibly controlled by the wheel drive means with command values of different polarities. The vehicle is therefore retractable, while the left and right wheels can be rotated in opposite directions to each other to turn the vehicle without translation.

The present invention provides a control program for driving an electrically movable vehicle by using a velocity command value calculating unit for calculating a translation velocity command value and a turn angular velocity command value for a center of gravity of the vehicle based on two-dimensional commands corresponding respectively to translation motion of the vehicle and turning motion thereof and obtained by a command value input unit, and a control command value calculating unit for calculating control values for controlling wheel drive means for driving left and right wheels of the vehicle independently of each other in corresponding relation with the translation velocity command value and the turn angular velocity command value calculated by the velocity command value calculating unit, to drive the wheel drive means. The program is characterized in that the velocity command value calculating unit is caused to function so as to determine one of the velocity command value for the translation motion of the vehicle and the velocity command value for the turning motion thereof from a command value obtained by the command value input unit, and to calculate and determine the other velocity command value from a detected velocity corresponding to the velocity command value determined.

With the control program for driving the vehicle, the velocity command value calculating unit determines one of the velocity command value for the translation motion of the vehicle and the velocity command value for the turning motion thereof from a command value obtained by the command value input unit. The calculating unit calculates and determines the other velocity command value from a detected velocity corresponding to the velocity command value determined. Thus, after one of the velocity command values has been determined, the velocity command value for the other motion is determined so as to satisfy the stabilizing condition. Accordingly, a translation velocity command value and a turning motion velocity command value can be determined efficiently which will satisfy the stabilizing condition, for example, for preventing the vehicle from falling down due to a centrifugal force. This realizes the control of the vehicle with a simplified program unlike the case wherein judgment is made as to whether the stabilizing condition can be satisfied after the two motion velocities have been determined.

According to the invention, the electrically movable vehicle can be driven with high stability and high mobility by a simple mode of control.

DESCRIPTION OF THE PREFERRED EMBODIMENTS

Figure 1:
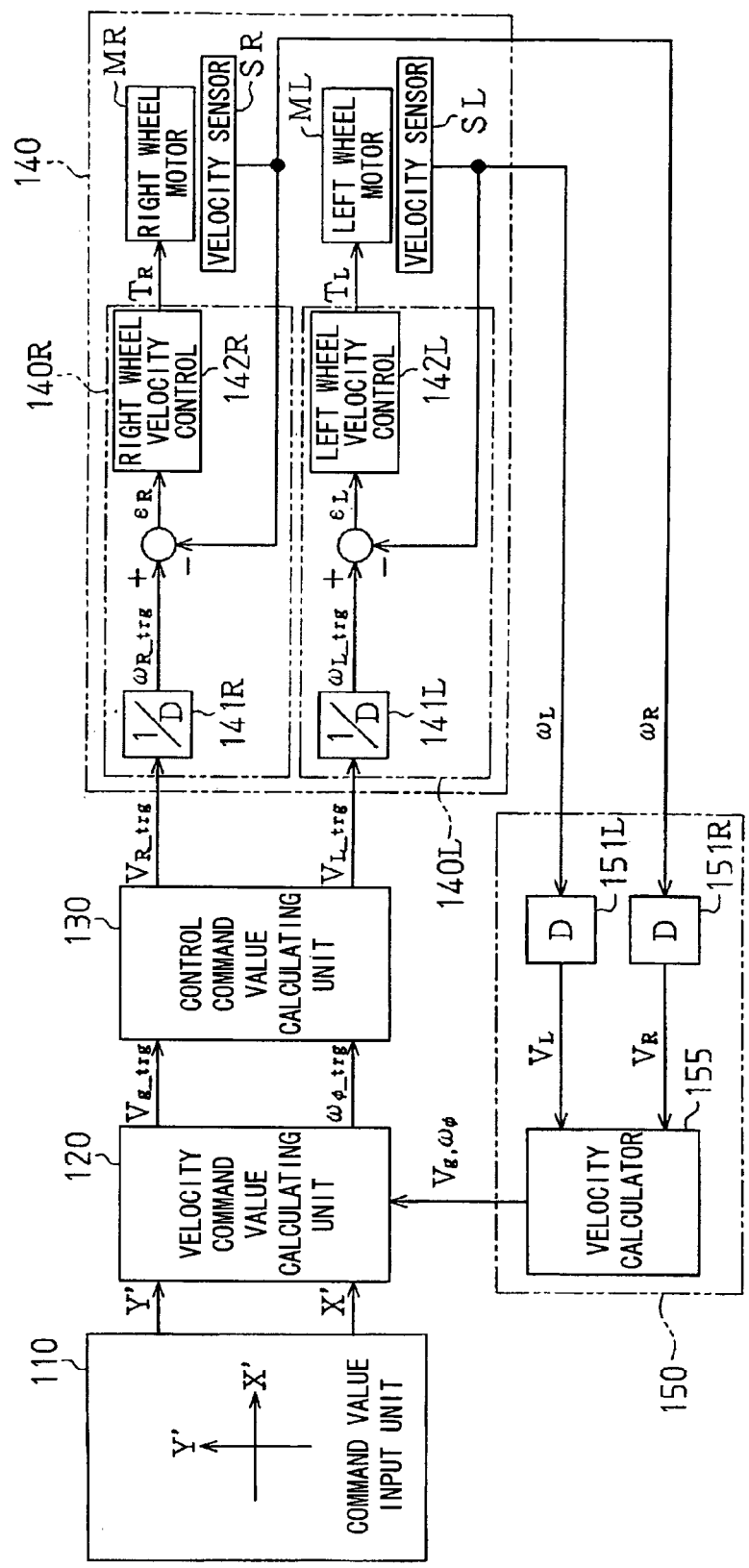
FIG. 1 is a block diagram showing the construction of a wheel chair drive controller embodying the invention.
Figure 2:
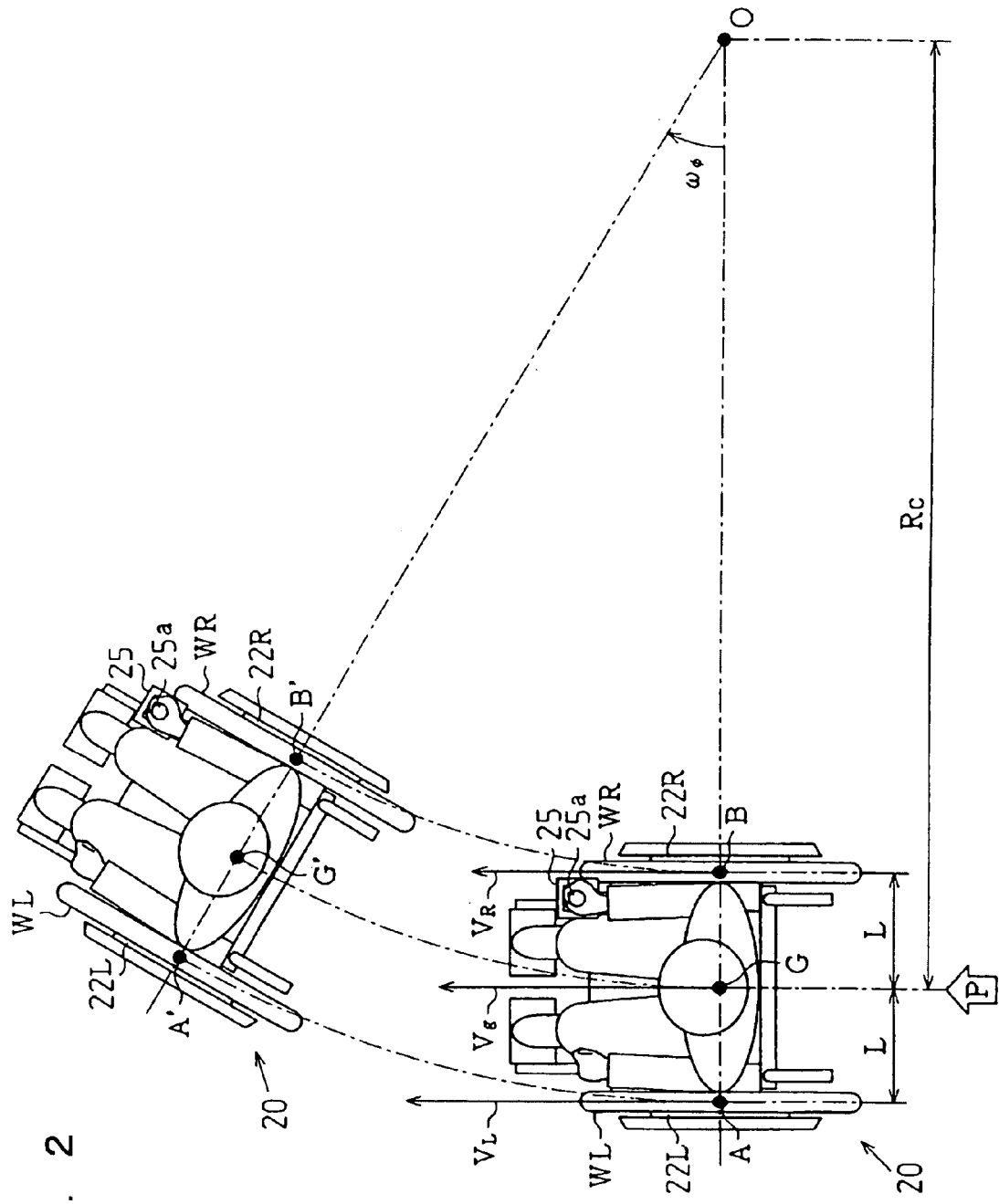
FIG. 2 is a plan view of a wheelchair for illustrating values for use in embodiments.
Figure 3:
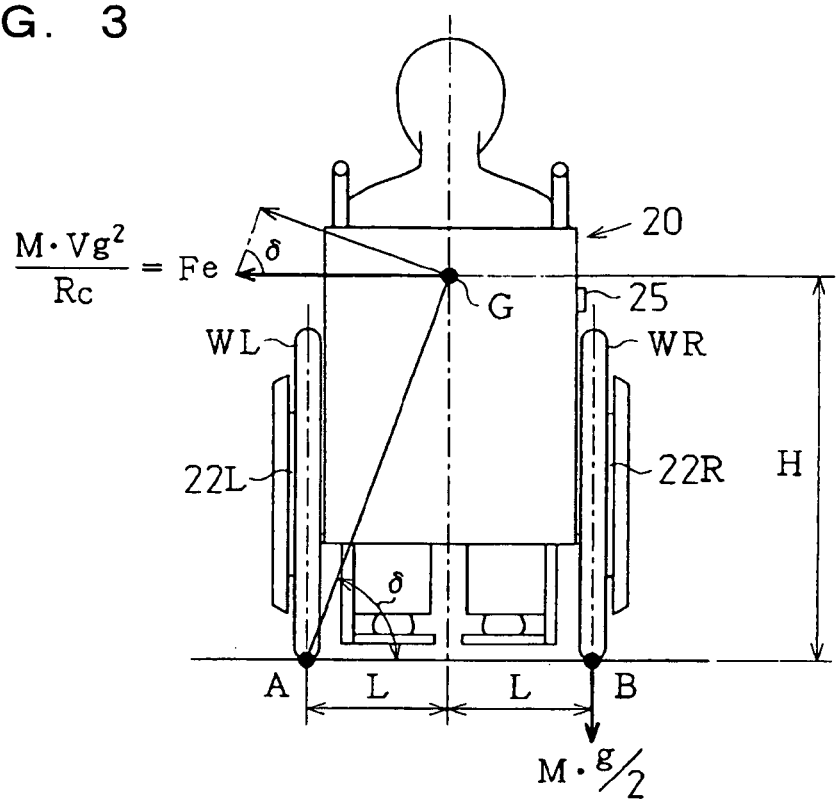
FIG. 3 is a front view of the wheelchair as it is seen from the direction of arrow P in FIG. 2 for illustrating the values.

Electrically movable vehicles embodying the invention as wheelchairs will be described below with reference to FIGS. 1 to 13. FIG. 1 is a block diagram of a controller for the electrically movable vehicle of the invention, FIG. 2 is a plan view of a wheelchair 20 as it is seen from above, and FIG. 3 is a diagram of the wheelchair 20 as it is seen from the direction of the arrow 20 in FIG. 20.

The wheelchair 20 will be described first with reference to FIGS. 2 and 3. With reference to these drawings, the wheelchair 20 has a frame, a pair of left and right free wheels (not shown), and a pair of right and left drive wheels WR, WL. The front portion of the frame is supported by the free wheels, and the rear portion of the frame by the drive wheels WR, WL, which move the wheelchair 20. The drive wheel WR is positioned at the right side of the rider of the wheelchair 20, and the drive wheel WL is positioned at the left side of the rider.

The drive wheels WR, WL are supported by respective axles which are independent of each other and are attached to the frame. These axles are covered with respective casings 22R, 22L and can be driven by the rotation of respective motors MR, ML (see FIG. 1) enclosed with the casings 22R, 22L, respectively. These motors MR, ML are reversible motors and function as wheel drive means. The motors WR, WL can be driven in the same direction or opposite directions depending on the direction of rotation of the motors MR, ML, whereby the wheelchair 20 can be translated forward or rearward, or turned rightward or leftward. Arranged in the vicinity of the drive wheels WR, WL are respective velocity sensors SR, SL for measuring the rotational angular velocities $\omega_R$, $\omega_L$ of drive wheels WR, WL.

On the other hand, the frame is provided with a seat unit providing a backrest, armrests and footrests for supporting the body of the rider. The frame is further provided with a pair of rims enabling the rider of the wheelchair 20 to drive the wheelchair 20 with his or her own power and a pair of handles to be used by the helper to drive the wheelchair 20 with human power. The frame is further provided with a manipulation unit 25 for use in driving the drive wheels WR, WL with the motors MR, ML.

Figure 4:
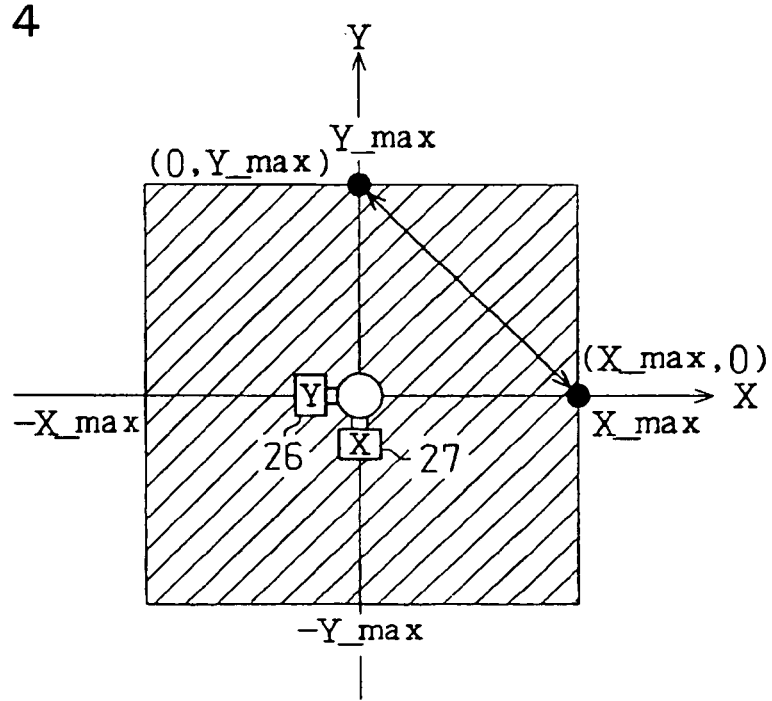
FIG. 4 is a diagram for illustrating the coordinates of two-dimensional input command means.

The manipulation unit 25 comprises a power source switch (not shown) and a joystick 25a. The switch serves to energize the motors MR, ML and the drive controller to be described below therethrough for electrically driving the wheels WR, WL. The joystick 25a is a controller which is to be manipulated by the rider for giving a command about the direction of advance of the wheelchair 20. The joystick 25a gives instructions on the direction of advance with respect to two-dimensional directions, i.e., x-direction and y-direction as shown in FIG. 4. The joystick 25a is provided with a y-direction potentiometer 26 and an x-direction potentiometer 27. Accordingly, the potentiometer 26 detects the amount of manipulation of the joystick 25a in the y-direction (y-direction command input value Y) as a command value. The potentiometer 27 detects the amount of manipulation of the joystick 25a in the x-direction (x-direction command input value X) as a command value. In the mode of the present embodiment, the direction of advance of the wheelchair 20 is referred to as the y-direction, and the direction away from this direction through 90 degrees rightward as the x-direction.

Next with reference to FIG. 1, a description will be given of the construction of the drive controller for the wheelchair 20 for electrically controlling the drive wheels WR, WL of the wheelchair 20. As shown in FIG. 1, the drive controller has incorporated therein a command value input unit 110, velocity command value calculating unit 120, control command value calculating unit 130, motor control unit 140 and velocity calculating unit 150.

Command values indicating the direction of movement of the wheelchair 20 two-dimensionally (in x-direction and y-direction) are input to the command value input unit 110, for example, by the rider. According to the present embodiment, the command input unit 110 has stored therein the maximum Xmax of x-direction command input values and the maximum Ymax of y-direction command input values to be detected by the potentiometers 26, 27. Based on the x-direction command value X and the y-direction command value Y detected by the potentiometers 26, 27, the command input unit 110 calculates an x-direction command input normalized value X' and y-direction command input normalized value Y'. The x-direction command input normalized value X' is calculated from X'=X/Xmax. The x-direction command input normalized value X' thus given is −1≦X'≦1. The y-direction command input normalized value Y' is calculated from Y'=Y/Ymax. The y-direction command input normalized value Y'thus given is −1≦Y'≦1.

Based on the input command values (i.e., the x-direction command input normalized value X' and y-direction command input normalized value Y') supplied from the command value input unit 110, the velocity command value calculating unit 120 calculates velocity command values (translation velocity command value $V_{g\_trg}$ and command value of turn angular velocity about the center of gravity G, $\omega_{f\_trg}$). This calculating unit 120 calculates the velocity command values in the following manner with consideration given to the geometrical restraining conditions of the wheelchair 20 shown in FIGS. 2 and 3.

The following premises are assumed in calculating the velocity command values. With reference to FIGS. 2 and 3, suppose the center of gravity of the wheelchair 20 and the rider combined is G, the radii of the drive wheels WR, WL are D [m], the rotational angular velocity of the right side is $\omega_R$ [rad/sec], and the rotational angular velocity of the left side is $\omega_L$ [rad/sec]. On the assumption that the center of gravity G is positioned at the midpoint between the drive wheels WR, WL, it is assumed that the horizontal distances between the center of gravity G and the points of contact of the wheels WR, WL with the ground are L {m}. Further suppose the vertical distance from the center of gravity G to the ground contact points of the wheels is H {m}. From these assumptions, the velocity $V_R$ of the right drive wheel WR in the direction of translation is expressed by $V_R = D \cdot \omega_R$ [m/sec], and the velocity $V_L$ of the left drive wheel WL in the direction of translation is expressed by $V_L = D \cdot \omega_L$ [m/sec]. Further suppose the velocity of the center of gravity G in the direction of translation is $V_g$, the turn angular velocity about the center of gravity G is $\omega_f$[rad/sec], and the radius of gyration of the wheelchair 20 is $R_c$ [m].

From the above conditions, the distance the wheelchair 20 advances per unit time is expressed as follows. In the mathematical expressions given below, A is the point of contact of the drive wheel WR with the ground, B is the ground contact point of the wheel WL, A' is the ground contact point of the wheel WR after the lapse of unit time, B' is the ground contact point of the wheel WL after the lapse of unit time, and G' is the center of gravity after the lapse of unit time.

$$\overrightarrow{BB}' = V_R = (R_C - L) \cdot \omega_\phi \quad (1\text{-}1)$$

$$\overrightarrow{AA}' = V_L = (R_C + L) \cdot \omega_\phi \quad (1\text{-}2)$$

$$\overrightarrow{GG}' = V_g = R_C \cdot \omega_\phi \quad (1\text{-}3)$$

From Expressions (1-1) to (1-3), the translation direction velocity $V_g$, turn angular velocity $\omega_f$ and radius of gyration $R_c$ are given by the following expressions.

$$V_g = \frac{V_L + V_R}{2} \quad (1\text{-}4)$$

$$\omega_\phi = \frac{V_L - V_R}{2L} \quad (1\text{-}5)$$

$$R_c = \frac{V_L + V_R}{V_L - V_R} \cdot L \quad (1\text{-}6)$$

The translation velocity command value $V_{g\_trg}$ and the turn angular velocity command value about the center of gravity G, $\omega_{f\_trg}$, are as follows.

$$V_{g\_trg} = \begin{cases} V_{sup+} \cdot Y' & (1 \geq Y' \geq 0) \quad V_{sup+} \geq V_{sup-} > 0 \\ V_{sup-} \cdot Y' & (0 > Y' \geq -1) \end{cases} \quad (1\text{-}7)$$

$$\omega_{\phi\_trg} = \begin{cases} \omega_{sup+} \cdot X' & (\geq X' \geq 0) \quad \omega_{sup+} \geq \omega_{sup-} > 0 \\ -\omega_{sup-} \cdot X' & (0 > X' \geq -1) \end{cases} \quad (1\text{-}8)$$

In Expressions (1-7) and (1-8), $V_{sup+}$ is the upper limit value of translation velocity command values at the gravity G for advance, and $V_{sup-}$ is the upper limit value of translation velocity command values at the center of gravity G for reverse travel. Further $\omega_{sup+}$ is the upper limit value of rotational velocity command values at the center of gravity G for advance, and $\omega_{sup-}$ is the upper limit value of rotational velocity command values at the center of gravity G for reverse travel.

From Expressions (1-5) to (1-8), velocity control command values $V_{R\_trg}$, $V_{L\_trg}$ and rotational angular velocity control command values $\omega_{R\_trg}$, $\omega_{L\_trg}$ for the left and right wheels are determined as follows.

$$V_{R\_trg} = V_{g\_trg} - L \cdot \omega_{\phi\_trg} \quad (1\text{-}9)$$

$$V_{L\_trg} = V_{g\_trg} + L \cdot \omega_{\phi\_trg} \quad (1\text{-}10)$$

$$\omega_{R\_trg} = V_{R\_trg}/D \quad (1\text{-}11)$$

$$\omega_{L\_trg} = V_{L\_trg}/D \quad (1\text{-}12)$$

On the other hand, when the wheelchair 20 is turned, the inner wheel (right drive wheel WR in the embodiment shown in FIG. 2) will rise to entail a fall as shown in FIG. 3. Now, suppose the gravitation acceleration is g, and the combined weight of the vehicle and the rider is M {kg}. The centrifugal force Fe then acts at the center of gravity G.

$$F_e = \frac{M \cdot V_g^2}{R_C} \quad (2\text{-}1)$$

Accordingly, considering the balance of the perpendicular moment about the ground contact point A of the outer wheel (left drive wheel WL in the present embodiment), the conditions for preventing the inner wheel from rising and the wheelchair 20 from falling down are expressed as follows.

$$F_e \cdot \sin\delta \cdot \sqrt{L^2 + H^2} \leq \frac{M \cdot g}{2} \cdot 2L \quad (2\text{-}2)$$

$$\frac{V_g^2}{R_C} \leq \frac{L}{H} \cdot g \quad (2\text{-}3)$$

$$\therefore |V_g \cdot \omega_\phi| \leq \frac{L}{H} \cdot g \quad (2\text{-}4)$$

Expression (2-3) is obtained by substituting the values of the centrifugal force Fe and sin d of Expression (2-1) in Expression (2-2) and rearranging the resulting expression. Expression (2-4) is obtained by substituting Expression (1-3) in Expression (2-3) and eliminating the radius of gyration $R_c$ from Expression (2-3).

Expression (2-4) thus obtained indicates that the translation direction velocity $V_g$ of the center of gravity G of the wheelchair 20 and the turn angular velocity $\omega_f$ of the center of gravity G can not be determined independently when the wheelchair 20 is to be prevented from falling down.

Accordingly, using one of the input values (x-direction command input normalized value X' and y-direction command input normalized value Y') supplied from the command value input unit 110, the velocity command value calculating unit 120 of the present embodiment determines one of the command values. The velocity command value calculating unit 120 also determines the other command value so that an output (detected velocity) for the above-mentioned one input value and the other input value (y-direction command input normalized value Y' or x-direction command input normalized value X') will satisfy the conditions of Expression (2-4). In this way, the velocity command value calculating unit 120 calculates the translation velocity command value $V_{g\_trg}$ at the center of gravity G of the wheelchair 20 and the command value of turn angular velocity about the center of gravity G, $\omega_{f\_trg}$.

On the other hand, the control command value calculating unit 130 calculates velocity control command values $V_{R\_trg}$, $V_{L\_trg}$ for the drive wheels WR, WL. Stated more specifically, the control command value calculating unit 130 has stored therein the value of horizontal distance L. Further the translation velocity command value $V_{g\_trg}$ at the center of gravity G and the command value of turn angular velocity about the center of gravity G, $\omega_{f\_trg}$, calculated by the velocity command value calculating unit 120 are supplied to the control command value calculating unit 130. Accordingly, the calculating unit 130 substitutes the value of horizontal distance L and the translation velocity command value $V_{g\_trg}$ and the turn angular velocity command value $\omega_{f\_trg}$ in Expression (1-9) and Expression (1-10) to calculate the velocity command control values $V_{R\_trg}$, $V_{L\_trg}$ for the left and right drive wheels WR, WL.

Further the motor control unit 140 controls the drive wheels WR, WL based on the velocity control command values $V_{R\_trg}$, $V_{L\_trg}$ for the left and right drive wheels WR, WL which are output from the calculating unit 130. Stated more specifically, the motor control unit 140 comprises a right motor control unit 140R and a left motor control unit 140L. The control command value calculating unit 130 feeds the velocity control command value $V_{R\_trg}$ to the right motor control unit 140R. The unit 130 feeds the velocity control command value $V_{L\_trg}$ to the left motor control unit 140L.

The right motor control unit 140R comprises a rotational angular velocity conversion element 141R and a right wheel velocity control 142R. The left motor control unit 140L comprises a rotational angular velocity conversion element 141L and a left wheel velocity control 142L.

The velocity control command values $V_{R\_trg}$, $V_{L\_trg}$ delivered from the control command value calculating unit 130 are divided by the wheel radius D by the rotational angular velocity conversion elements 141R, 141L, whereby the command values are converted to rotational angular velocity control command values $\omega_{R\_trg}$, $\omega_{L\_trg}$ for the respective wheels.

The motor control unit 140 calculates the deviation $e_R$ of the rotational angular velocity $\omega_R$ of the right drive wheel WR measured by the velocity sensor SR from the rotational angular velocity control command value $\omega_{R\_trg}$ of the wheel as converted by the rotational angular velocity conversion element 141R. The motor control unit 140 further supplies the calculated deviation $e_R$ to the right wheel velocity control 142R. Based on the supplied deviation $e_R$, the control 142R feeds a right wheel torque command value $T_R$ to the motor MR for the right wheel. The motor is driven with this right wheel torque command value $T_R$. Similarly, the motor control unit 140 calculates the deviation $e_L$ of the rotational angular velocity $\omega_L$ of the left drive wheel WL measured by the velocity sensor SL from the rotational angular velocity control command value $\omega_{L\_trg}$ which is output from the rotational angular velocity conversion element 141L, and further supplies the deviation to the left wheel velocity control 142L. Based on the supplied deviation $e_L$, the control 142L feeds a left wheel torque command value $T_L$ to the motor ML for the left wheel to drive the motor ML.

On the other hand, the velocity calculating unit 150 comprises velocity conversion elements 151R, 151L and a velocity calculator 155. These elements 151R, 151L convert the rotational angular velocities $\omega_R$, $\omega_L$ detected by the velocity sensors SR, SL to translation direction velocities $V_R$, $V_L$, respectively.

Based on the translation direction velocities $V_R$, $V_L$ obtained by the elements 151R, 151L, the velocity calculator 155 calculates the translation direction velocity $V_g$ at the center of gravity G or turn angular velocity $\omega_f$ about the center of gravity G. The velocity calculator 155 feeds the translation direction velocity $V_g$ or turn angular velocity $\omega_f$ calculated to the velocity command value calculating unit 120.

Embodiment 1

Next, Embodiment 1 wherein the construction described above is used will be described with reference to FIGS. 5 to 7.

In Embodiment 1, a translation velocity command value $V_{g\_trg}$ for translation motion is determined using a command input value in y-direction which is the direction of straight advance. Further in Embodiment 1, a command value of turn angular velocity about the center of gravity G, $\omega_{f\_trg}$, is also determined from a command input value in the x-direction which is the turn direction and the translation direction velocity $V_g$ of the center of gravity G of the wheelchair 20.

Figure 6:
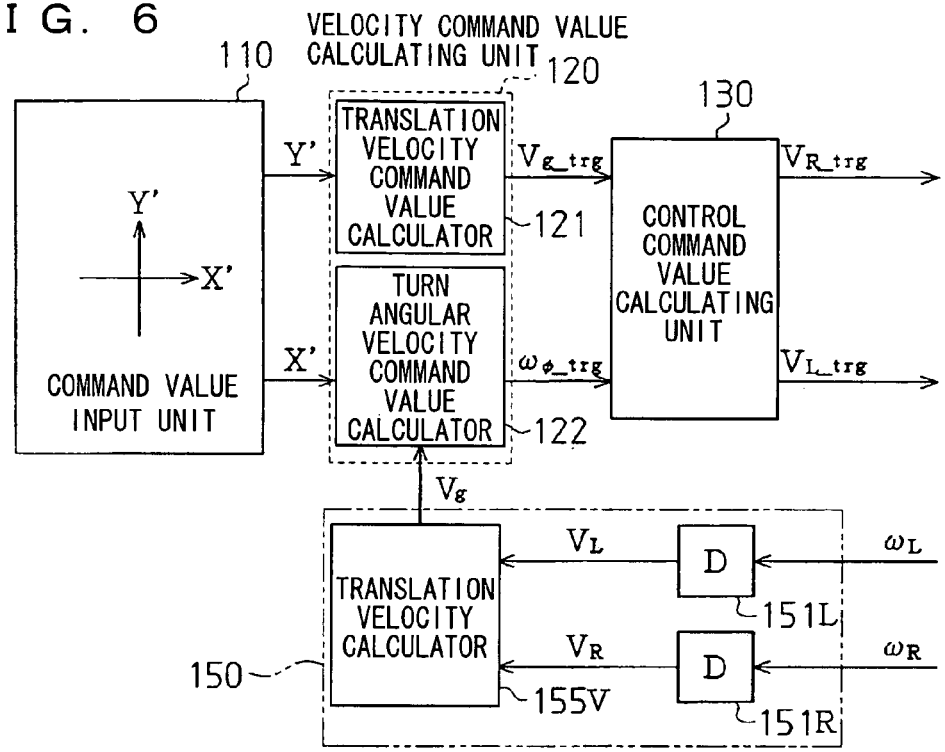
FIG. 6 is a block diagram showing the main arrangement of a drive controller according to Embodiment 1.
Figure 7:
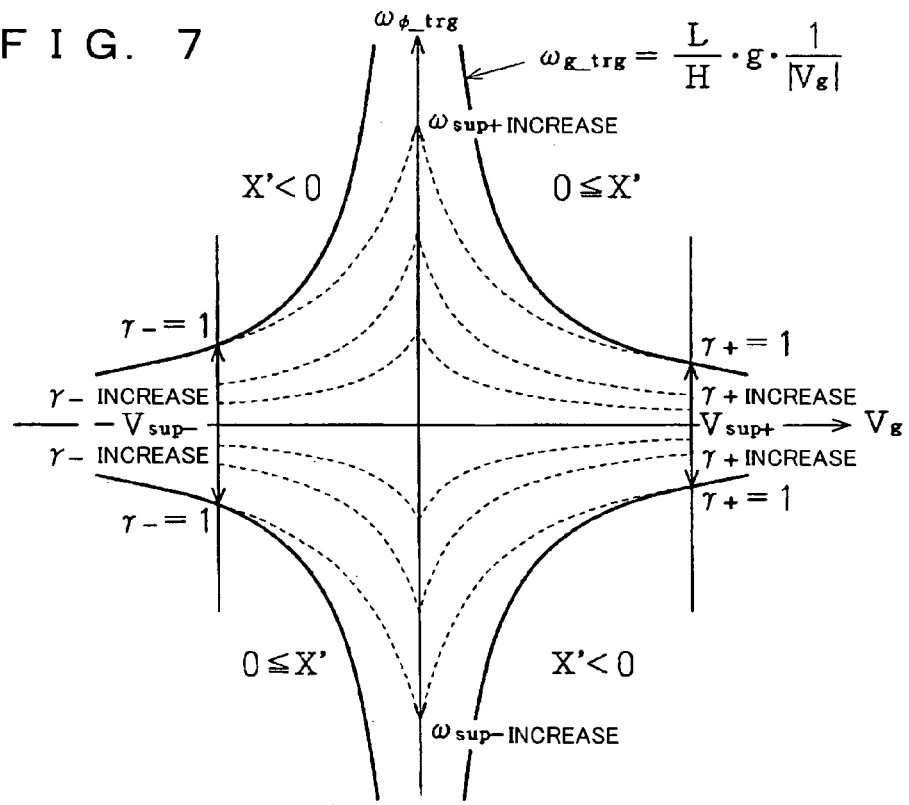
FIG. 7 is a diagram showing the relationship between the translation direction velocity and turn angular velocity command value in Embodiment 1.

According to the present embodiment, the velocity command value calculating unit 120 comprises a translation velocity command value calculator 121 and a turn angular velocity command value calculator 122 as shown in FIG. 6.

The translation velocity command value calculator 121 calculates the command value $V_{g\_trg}$ of translation velocity at the center of gravity G.

Stated more specifically, the calculator 121 uses the value of y-direction command input normalized value Y' to be supplied from the command value input unit 110 and Expression (1-7) given above.

The turn angular velocity command value calculator 122 calculates the turn angular velocity command value $\omega_{f\_trg}$. While giving consideration to the translation direction velocity $V_g$ at the center of gravity G and based on the y-direction command input normalized value Y' to be supplied from the command value input unit 110, the calculator 122 calculates the turn angular velocity command value $\omega_{f\_trg}$ in the present embodiment. More specifically, the value is given by Expression (2-5) given below. $a_+$ in Expression (2-5) is given by Expression (2-6), $\beta_+$ therein by Expression (2-7), $a_-$ therein by Expression (2-8) and $\beta_-$ therein by Expression (2-9).

$$\omega_{\phi\_\text{trg}} = \begin{cases} \dfrac{\alpha_+}{|V_g|+\beta_+} \cdot X' & (1 \geq X' \geq 0) \\ -\dfrac{\alpha_-}{|V_g|+\beta_-} \cdot X' & (0 > X' \geq -1) \end{cases} \quad (2\text{-}5)$$

$$\alpha_+ = \dfrac{\dfrac{L}{H} \cdot g \cdot V_{sup+} \cdot \omega \cdot \gamma_+}{V_{sup+} \cdot \omega_{sup} - \dfrac{L}{H} \cdot g \cdot \gamma_+} \quad (2\text{-}6)$$

$$\beta_+ = \dfrac{\dfrac{L}{H} \cdot g \cdot V_{sup+} \cdot \gamma_+}{V_{sup+} \cdot \omega_{sup} - \dfrac{L}{H} \cdot g \cdot \gamma_+} \quad (2\text{-}7)$$

$$\alpha_- = \dfrac{\dfrac{L}{H} \cdot g \cdot V_{sup-} \cdot \omega_{sup} \cdot \gamma_-}{V_{sup-} \cdot \omega_{sup} - \dfrac{L}{H} \cdot g \cdot \gamma_-} \quad (2\text{-}8)$$

$$\beta_- = \dfrac{\dfrac{L}{H} \cdot g \cdot V_{sup-} \cdot \gamma_-}{V_{sup-} \cdot \omega_{sup} - \dfrac{L}{H} \cdot g \cdot \gamma_-} \quad (2\text{-}9)$$

The absolute value $|V_g|$ of the gravity center translation direction velocity $V_g$ in the above Expression (2-5) is the magnitude of the translation velocity of the center of gravity G obtained from the translation direction velocities $V_R$, $V_L$ of the drive wheels WR, WL using Expression (1-4). If the rotational velocity command value upper limit $\omega_{sup} > 0$, and condition values $\gamma_+$, $\gamma_- < 1$, the turn angular velocity command value $\omega_{f\_trg}$ fulfils the condition of Expression (2-4) at all times. In this case, therefore, the vehicle can be prevented from falling down during turning.

On the other hand according to the present embodiment, the velocity calculating unit 150 has a translation velocity calculator 155V as the velocity calculator 155 as shown in FIG. 6. The translation velocity calculator 155V calculates the translation direction velocity $V_g$ at the center of gravity G. More specifically, the calculator 155V calculates the translation direction velocity $V_g$ at the center of gravity G using the translation direction velocities $V_R$, $V_L$ obtained by the velocity conversion elements 151R, 151L of the velocity calculating unit 150 and Expression (1-4) given above.

Next, a description will be given of a control processing procedure according to the present embodiment with reference to FIG. 5.

First, the command value input unit 110 obtains an x-direction command input value X and a y-direction command input value Y (Step S1-1). More specifically, when the joystick 25a is manipulated in two-dimensional directions, the potentiometers 26, 27 detect the respective amounts of manipulation (x-direction command input value X and y-direction command input value Y) as command values.

The unit 110 calculates an x-direction command input normalized value X' and a y-direction command input normalized value Y' (Step S1-2). More specifically, the input unit 110 divides the x-direction command input value X and y-direction command input value Y detected as command values by the maximum Xmax of x-direction command input values and the maximum Ymax of y-direction command input values.

Next, the rotational angular velocities $\omega_R$, $\omega_L$ measured by the velocity sensors SR, SL are used to obtain the values of translation direction velocities $V_R$, $V_L$ (Step S1-3).

The values of translation direction velocities $V_R$, $V_L$ are used for the translation velocity calculator 155V of the velocity calculating unit 150 to calculate the translation direction velocity $V_g$ at the center of gravity G (Step S1-4).

Next, the velocity command value calculating unit 120 calculates a translation velocity command value $V_{g\_trg}$ and turn angular velocity command value $\omega_{f\_trg}$. More specifically, the translation velocity command value calculator 121 of the velocity command value calculating unit 120 calculates the translation velocity command value $V_{g\_trg}$ based on the y-direction command input normalized value Y'. Further the turn angular velocity command value calculator 122 of the unit 120 calculates the turn angular velocity command value $\omega_{f\_trg}$ using the x-direction command input normalized value X' and the translation direction velocity $V_g$ calculated by the translation velocity calculator 155V in Step S1-4 (Step S1-5).

Subsequently the translation velocity command value $V_{g\_trg}$ and turn angular velocity command value $\omega_{f\_trg}$ calculated are used for the control command value calculating unit 130 to calculate velocity control command values $V_{R\_trg}$, $V_{L\_trg}$ for the drive wheels WR, WL (Step S1-6). These command values $V_{R\_trg}$, $V_{L\_trg}$ are fed to the motor control unit 140 as control values to drive the motors MR, ML. In this way, the right and left drive wheels WR, WL are driven.

To clarify the meanings of the condition value $\gamma$ and the upper limit $\omega_{sup}$ for rotational velocity command values in Expressions (2-6) to (2-9) given above, the following calculations are performed.

$$\omega_{\phi\_\text{trg}}\big|_{X'=1,|V_g|=0} = \begin{cases} \dfrac{\alpha_+}{\beta_+} = \omega_{sup} & (1 \geq Y' \geq -1) \\ -\dfrac{\alpha_-}{\beta_-} = -\omega_{sup} & (0 > Y' \geq -1) \end{cases} \quad (2\text{-}10)$$

$$\omega_{\phi\_\text{trg}}\big|_{X'=1,|V_g|=V_{sup}} = \quad (2\text{-}11)$$

$$\begin{cases} \dfrac{\alpha_+}{V_{sup+}+\beta_+} = \gamma_+ \cdot \dfrac{L}{H} \cdot g \cdot \dfrac{1}{V_{sup+}} & (1 \geq Y' \geq 0) \\ -\dfrac{\alpha_-}{V_{sup-}+\beta_-} = \gamma_- \cdot \dfrac{L}{H} \cdot g \cdot \dfrac{1}{V_{sup-}} & (0 > Y' \geq -1) \end{cases}$$

These expressions indicate that $\omega_{sup}$ represents the upper limit of turn angular velocity command values $\omega_{f\_trg}$ in the case where the translation direction velocity is zero, and $\gamma$ represents the ratio to the upper limit of permissible turn angular velocity command values $\omega_{f\_trg}$ in the case where the forward or reverse translation velocity is maximum. Incidentally, FIG. 7 shows the relationship between the translation direction velocity $V_g$ and the turn angular velocity command value $\omega_{f\_trg}$.

The present embodiment affords the following results.

(1) In the mode of present embodiment, the condition value $\gamma$ is set in the range of 0 to 1, and the turn angular velocity command value $\omega_{f\_trg}$ is determined from x-direction command input normalized value X' showing turning motion and the translation direction velocity $V_g$ of the wheelchair 20. Accordingly, even if the translation velocity command value $V_{g\_trg}$ is determined using the y-direction command as it is, the turn angular velocity command value $\omega_{f\_trg}$ is determined so as to satisfy Expression (2-4) in accordance with the value of the translation direction velocity $V_g$ of the center of gravity G. Consequently, the wheelchair 20 is turnable without falling down even if subjected to the centrifugal force Fe. Furthermore, it is possible to diminish the conditions to be judged when the velocity command value calculating unit 120 determines the translation velocity command value $V_{g\_trg}$ and the turn angular velocity command value $\omega_{f\_trg}$. This serves to simplify the structure of the program software to result in satisfactory driving of the wheelchair 20.

(2) According to the present embodiment, the y-direction command input normalized value Y' representing translation motion and resulting from one of the command values of the joystick 25a of the wheelchair 20 is used as it is in determining the translation velocity command value $V_{g\_trg}$. This preferentially assures the vehicle of the properties to advance straight, giving the wheelchair 20 improved mobility mainly when the vehicle performs translation motion.

Figure 5:
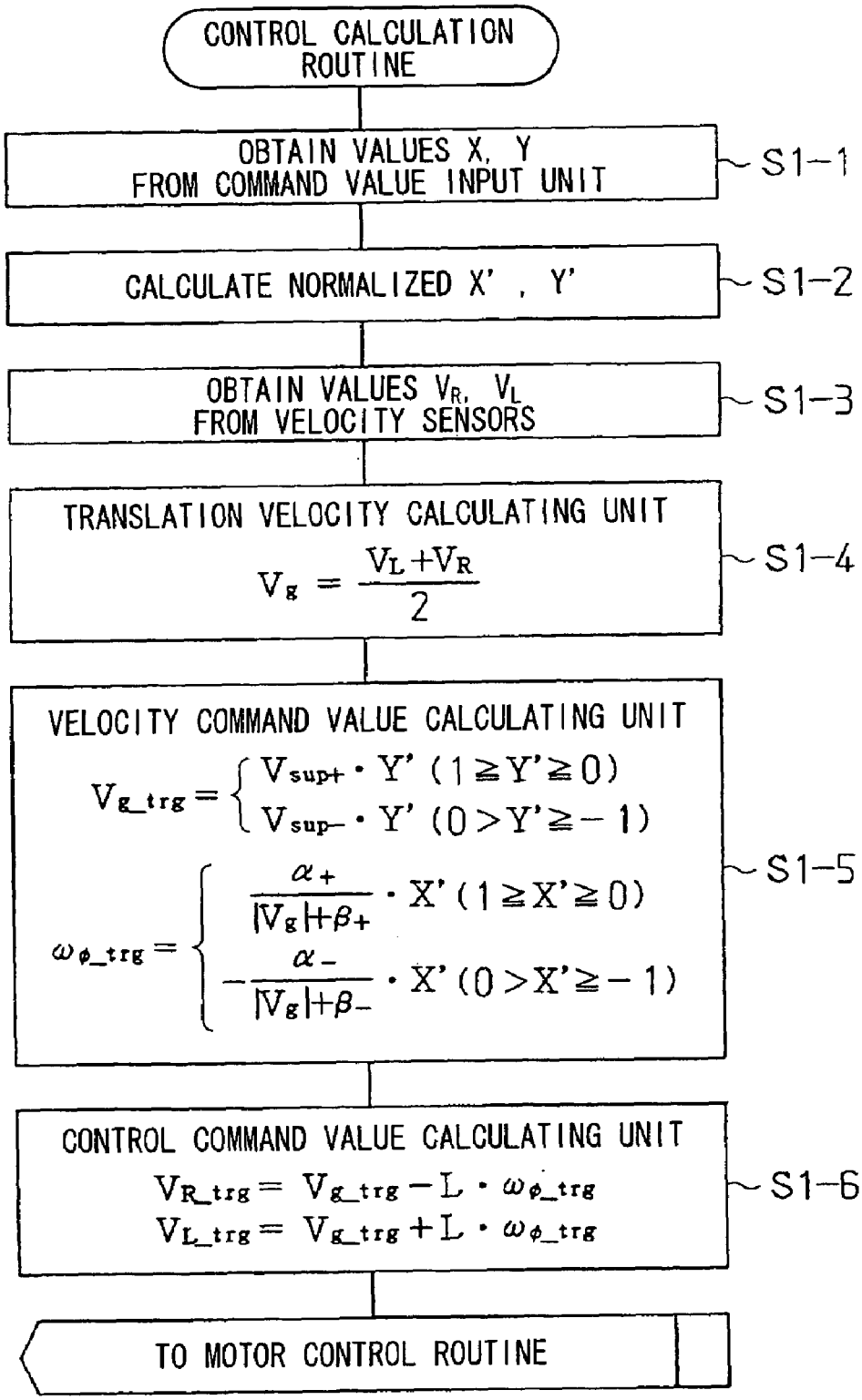
FIG. 5 is a flow chart of a control procedure according to Embodiment 1.

(3) According to the present embodiment, the input values X, Y given by the joystick 25a are converted to normalized values X', Y' in the range of −1 to 1 in the control procedure shown in FIG. 5. As represented by Expression (1-5), the normalized value Y' is multiplied by the upper limit $V_{sup}$ of translation velocity command values at the center of gravity G to determine the translation velocity command value $V_{g\_trg}$. For this reason, the translation velocity command value $V_{g\_trg}$ can be determined by a simple calculation always within a range not exceeding the upper limit $V_{sup}$ of translation velocity command values. This serves to simplify the control processing program in structure.

(4) According to the present embodiment, the x-direction command input value X and y-direction command input value Y can be both positive and negative, so that the vehicle is retractable. Further because the drive wheels WR, WL are rotatable in the reverse direction, the vehicle is turnable about the center of gravity G by rotating the wheels WR, WL in directions opposite to each other. For this reason, the wheelchair 20 can be turned in situ within a narrow space without moving forward or rearward.

Embodiment 2

Figure 8:
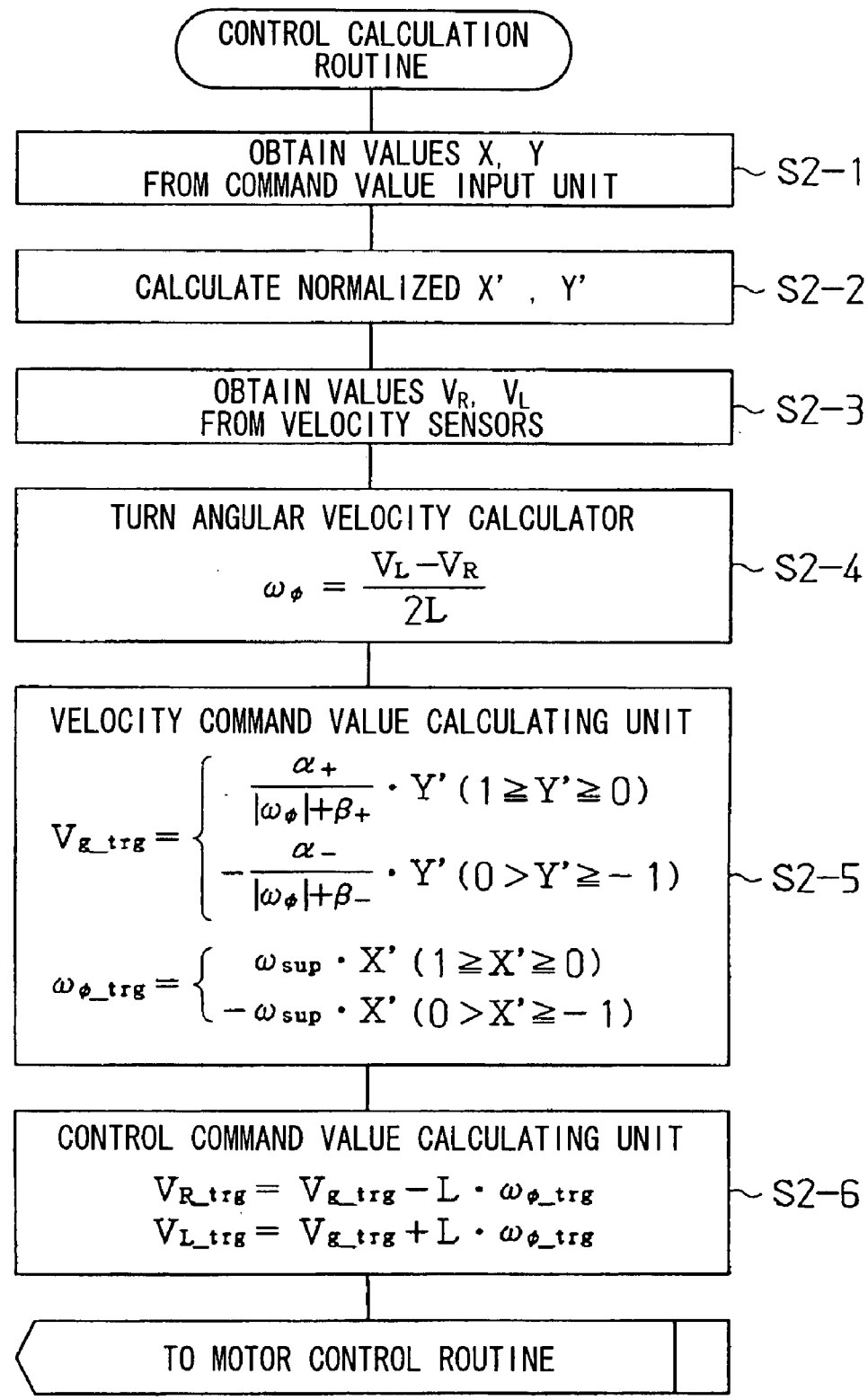
FIG. 8 is a flow chart of a control procedure according to Embodiment 2.

Next, Embodiment 2 wherein the construction described above is used will be described with reference to FIGS. 8 to 10.

In Embodiment 2, a turn angular velocity command value $\omega_{f\_trg}$ for turning motion is determined using a command input value in x-direction which is the turning direction. Further in Embodiment 2, a translation velocity command value $V_{g\_trg}$ at the center of gravity G is also determined from a command input value in the y-direction which is the straight advance direction and the turn angular velocity $\omega_f$ about the center of gravity G of the wheelchair 20.

Figure 9:
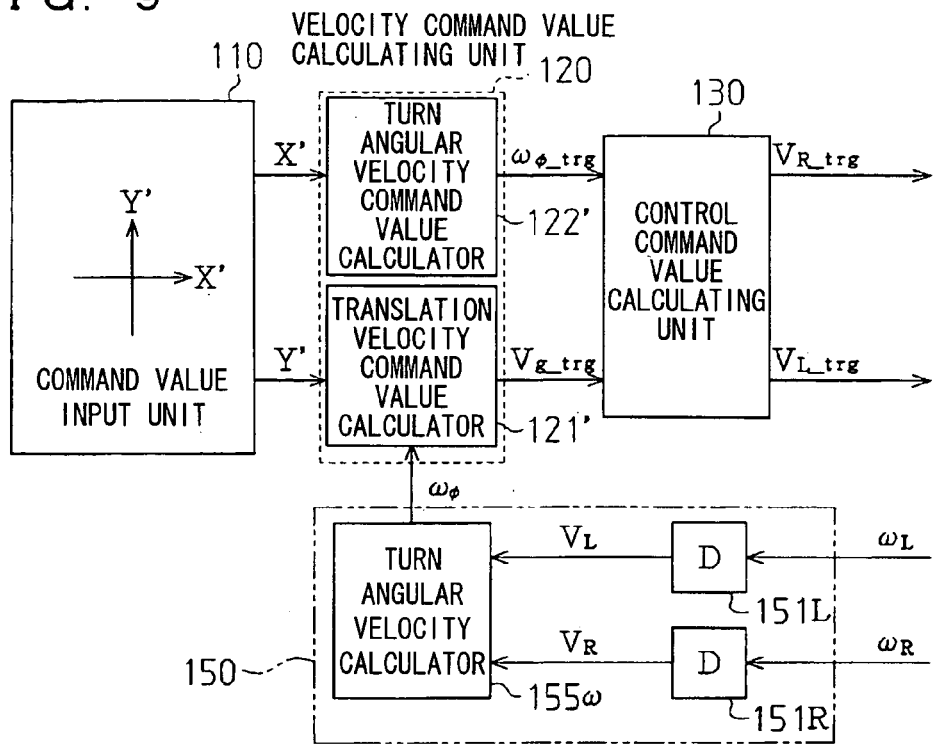
FIG. 9 is a block diagram showing the main arrangement of a drive controller according to Embodiment 2.
Figure 10:
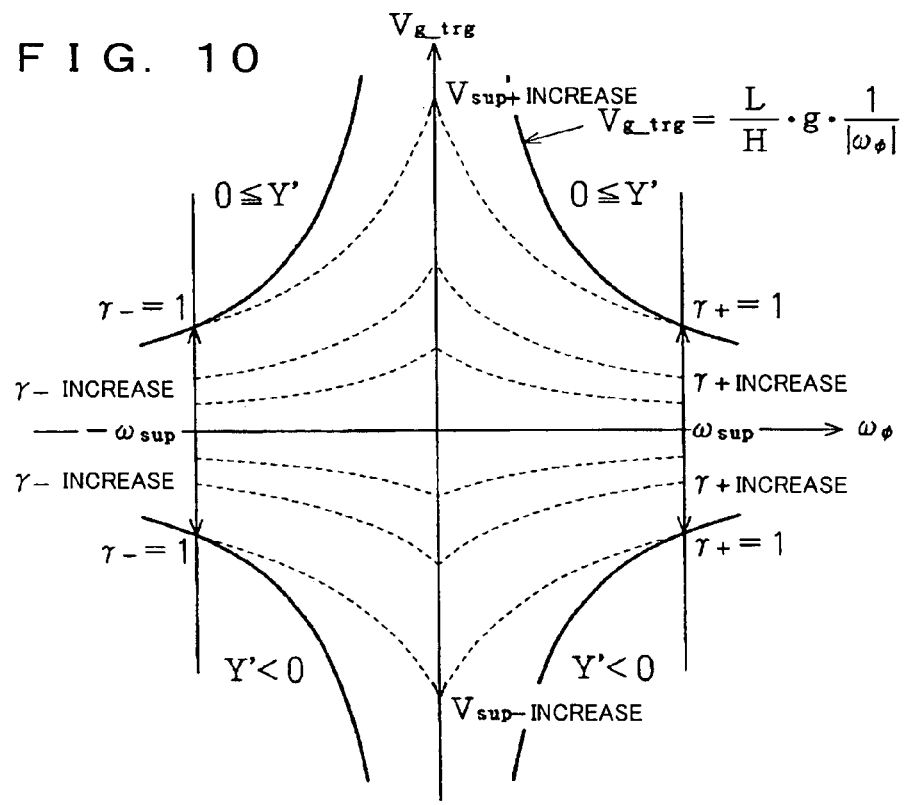
FIG. 10 is a diagram showing the relationship between the turn angular velocity and the translation velocity command value in Embodiment 2.

According to the present embodiment, the velocity command value calculating unit 120 comprises a turn angular velocity command value calculator 122' and a translation velocity command value calculator 121' as shown in FIG. 9.

The turn angular velocity command value calculator 122' calculates the command value of turn angular velocity $\omega_{f\_trg}$ about the center of gravity G. More specifically, the calculator 122' uses for the calculation the value of x-direction command input normalized value X' to be supplied from the command value input unit 110 and Expression (3-1) given below (which is the same as Expression (1-8) given above).

The translation velocity command value calculator 121' calculates the translation velocity command value $V_{g\_trg}$. While giving consideration to the turn angular velocity $\omega_f$ about the center of gravity G and based on the y-direction command input normalized value Y' to be supplied from the command value input unit 110, the calculator 121' calculates the translation velocity command value $V_{g\_trg}$ in the present embodiment. More specifically, the value is given by Expression (3-2) given below. $a_+$ in Expression (3-2) is given by Expression (3-3), $\beta_+$ therein by Expression (3-4), $a_-$ therein by Expression (3-5) and $\beta_-$ therein by Expression (3-6).

$$\omega_{\phi\_trg} = \begin{cases} \omega_{sup} \cdot X' & (1 \geq X' \geq 0) \\ -\omega_{sup} \cdot X' & (0 > X' \geq -1) \end{cases} \quad (3\text{-}1)$$

$$V_{g\_trg} = \begin{cases} \dfrac{\alpha_+}{|\omega_\phi| + \beta_+} \cdot Y' & (1 \geq Y' \geq 0) \\ -\dfrac{\alpha_-}{|\omega_\phi| + \beta_-} \cdot Y' & (0 > Y' \geq -1) \end{cases} \quad (3\text{-}2)$$

$$\alpha_+ = \dfrac{\dfrac{L}{H} \cdot g \cdot V_{sup+} \cdot \omega_{sup} \cdot \gamma_+}{V_{sup+} \cdot \omega_{sup} - \dfrac{L}{H} \cdot g \cdot \gamma_+} \quad (3\text{-}3)$$

$$\beta_+ = \dfrac{\dfrac{L}{H} \cdot g \cdot \omega_{sup} \cdot \gamma_+}{V_{sup+} \cdot \omega_{sup} - \dfrac{L}{H} \cdot g \cdot \gamma_+} \quad (3\text{-}4)$$

$$\alpha_- = \dfrac{\dfrac{L}{H} \cdot g \cdot V_{sup-} \cdot \omega_{sup} \cdot \gamma_-}{V_{sup-} \cdot \omega_{sup} - \dfrac{L}{H} \cdot g \cdot \gamma_-} \quad (3\text{-}5)$$

$$\beta_- = \dfrac{\dfrac{L}{H} \cdot g \cdot \omega_{sup} \cdot \gamma_-}{V_{sup-} \cdot \omega_{sup} - \dfrac{L}{H} \cdot g \cdot \gamma_-} \quad (3\text{-}6)$$

The absolute value $|\omega_f|$ of the turn angular velocity $\omega_f$ in the above Expression (3-2) is the magnitude of the rotational angular velocity about the center of gravity G obtained from the translation direction velocities $V_R$, $V_L$ of the drive wheels WR, WL using Expression (1-5). If the rotational velocity command value upper limit $\omega_{sup} > 0$, and condition values $\gamma_+$, $\gamma_- < 1$, the translation velocity command value $V_{g\_trg}$ fulfils the condition of Expression (2-4) at all times. In this case, therefore, the vehicle can be prevented from falling down during turning.

On the other hand according to the present embodiment, the velocity calculating unit 150 has a turn angular velocity calculator 155ω the velocity calculator 155 as shown in FIG. 9. The velocity calculator 155ω calculates the turn angular velocity $\omega_f$ about the center of gravity G. More specifically, the calculator 155ω calculates the turn angular velocity $\omega_f$ using the translation direction velocities $V_R$, $V_L$ obtained by the velocity conversion elements 151R, 151L of the velocity calculating unit 150 and Expression (1-5) given above.

Next, a description will be given of a control processing procedure according to the present embodiment with reference to FIG. 8.

like Steps S1-1 and S1-2 of Embodiment 1, the command value input unit 110 obtains an x-direction command input value X and a y-direction command input value Y (Step S2-1) according to the present embodiment and calculates an x-direction command input normalized value X' and a y-direction command input normalized value Y' (Step S2-2). Next as in Embodiment 1, Step S1-3, the rotational angular velocities $\omega_R$, $\omega_L$ measured by the velocity sensors SR, SL are used to obtain the values of translation direction velocities $V_R$, $V_L$ (Step S2-3).

The values of translation direction velocities $V_R$, $V_L$ are used for the turn angular velocity calculator 155ω of the velocity calculating unit 150 to calculate the turn angular velocity $\omega_f$ about the center of gravity G (Step S2-4).

Next, the velocity command value calculating unit 120 calculates a translation velocity command value $V_{g\_trg}$ and turn angular velocity command value $\omega_{f\_trg}$. More specifically, the turn angular velocity command value calculator 122' of the velocity command value calculating unit 120 calculates the turn angular velocity command value $\omega_{fLR\_trg}$ based on the x-direction command input normalized value X'. The translation velocity command value calculator 121' of the velocity command value calculating unit 120 calculates the translation velocity command value $V_{g\_trg}$ (Step S2-5) using the y-direction command input normalized value Y' and the turn angular velocity $\omega_f$ calculated by the calculator 155ω in Step S2-4.

Subsequently the translation velocity command value $V_{g\_trg}$ and turn angular velocity command value $\omega_{f\_trg}$ calculated are used for the control command value calculating unit 130 to calculate velocity control command values $V_{R\_trg}$, $V_{L\_trg}$ (Step S2-6) as in Step S1-6. These command values $V_{R\_trg}$, $V_{L\_trg}$ are fed to the motor control unit 140 as control values to drive the motors MR, ML. In this way, the right and left drive wheels WR, WL are driven. Incidentally, FIG. 10 shows the relationship between the turn angular velocity $\omega_f$ about the center of gravity G and the translation velocity command value $V_{g\_trg}$.

The present embodiment has the foregoing advantages (1), (3) and (4) of Embodiment 1 and further has the following advantage.

(5) According to the present embodiment, the x-direction command input normalized value X' representing turning motion and resulting from one of the command values of the joystick 25a of the wheelchair 20 is used as it is in determining the turn angular velocity command value $\omega_{f\_trg}$. This preferentially assures the vehicle of the turnability, giving the wheelchair 20 improved mobility when the vehicle needs to turn quickly as when traveling indoors.

Embodiment 3

Next, Embodiment 3 will be described with reference to FIGS. 11 to 13.

Figure 11:
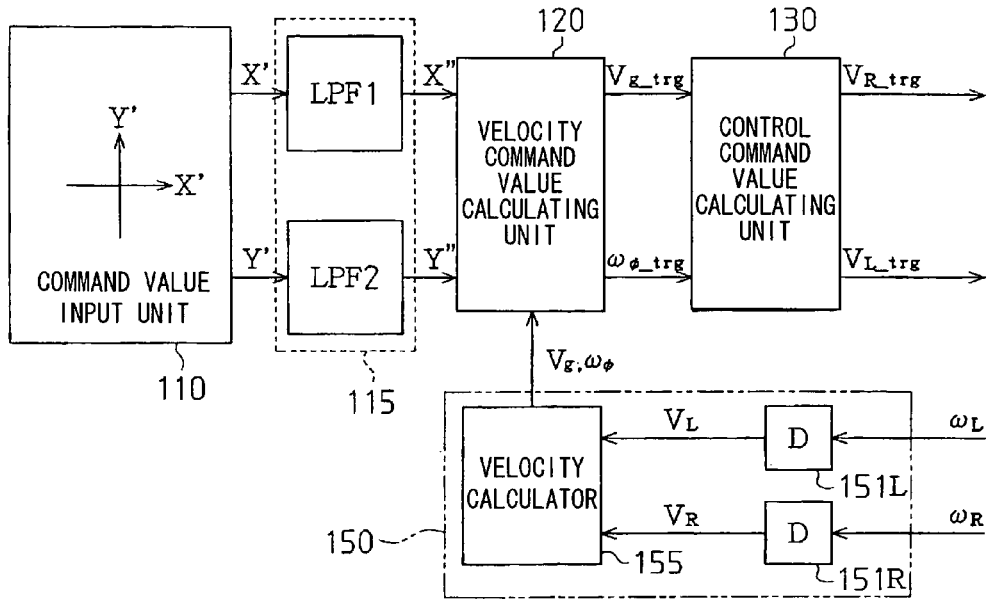
FIG. 11 is a block diagram showing the main arrangement of a drive controller according to Embodiment 3.
Figure 12:
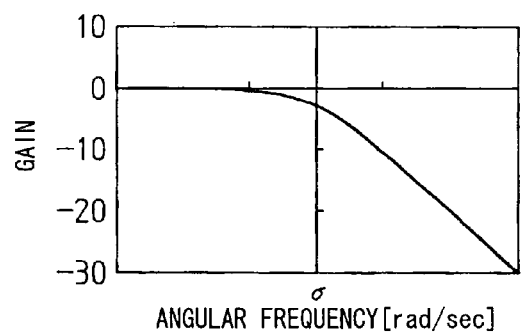
FIG. 12 is a diagram showing the gain-frequency characteristics of low-pass filters of Embodiment 3.

According to Embodiment 3, a low-pass filter unit 115 is provided between the command value input unit 110 and the velocity command value calculating unit 120 as shown in FIG. 11. The filter unit 115 has first and second low-pass filters LPF1, LPF2. With reference to FIG. 12 showing the gain-frequency characteristics of these filters, these filters are each a filter serving as a first-order lag element of $F(s)=s/(s+s)$ wherein s is the Laplacean operator, and s is the corner frequency.

To the first low-pass filter LPF1 is input the x-direction command input normalized value X' output from the command value input unit 110. An X-direction command input normalized value X" are output anew from the first low-pass filter LPF1.

The y-direction command input normalized value Y' output from the command value input unit 110 is input to the second low-pass filter LPF2. Output anew from the second low-pass filter LPF2 is a y-direction command input normalized value Y".

Figure 13:
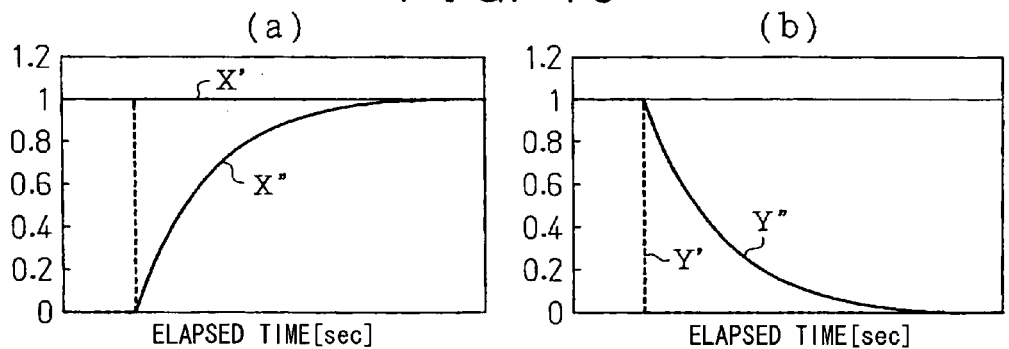
FIG. 13 includes diagrams showing command values before and after passage through the low-pass filter of Embodiment 3, (a) showing an x-direction command input normalized value X', (b) showing a y-direction command input normalized value Y'.

FIG. 13 includes diagrams showing the time response when the command input values vary from (0, Ymax) to (Xmax, 0), namely, when (X', Y') vary from (0, 1) to (1, 0) unit-stepwise as shown in FIG. 2. FIG. 13(*a*) shows the x-direction command input normalized value X' and the time response of the new x-direction command input normalized value X" after the passage of the input through the first low-pass filter LPF1. FIG. 13(*b*) shows the y-direction command input normalized value Y' and the time response of the new y-direction command input normalized value Y" after the passage of the input through the second low-pass filter LPF2.

The present embodiment has the following advantage in addition to those similar to the advantages of Embodiments 1 and 2 already described.

(6) According to the present embodiment, the low-pass filter unit 115 is disposed between the command value input unit 110 and the velocity command value calculating unit 120. Accordingly, the low-pass filters LPF1, LPF2 of the low-pass filter unit 115 outputs new normalized values X", Y" of first-order lag upon the passage of the normalized values X', Y' from the input unit 110 through the respective filters LPF1, LPF2. Since these normalized values X", Y" are of first-order lag and therefore vary gently unlike the normalized values X', Y' before the input. Even if the joystick 25a is manipulated disorderly, the wheelchair 20 can be moved smoothly.

The foregoing embodiments may be modified as will be described below. According to Embodiment 3, the low-pass filter unit 115 serving as a lag element is disposed between the command value input unit 110 and the velocity command value calculating unit 120. However, this unit may be of some other construction insofar as the unit serves as a lag element for the input command values to be given by the manipulation of the joystick 25a to produce command values for the velocity command value calculating unit 120. For example, the joystick 25a may be provided with a damper for the input unit 110 to obtain input values of lag element.

According to Embodiment 1, the y-direction command input normalized value Y' representing translation motion is used as it is to determine a turn angular velocity command value $\omega_{f\_trg}$ from the x-direction command input normalized value X' representing turning motion and the translation direction velocity $V_{g\_}$ of the wheelchair 20. Further according to Embodiment 2, the x-direction command input normalized value X' representing turning motion is used as it is to determine a translation velocity command value $V_{g\_trg}$ from the y-direction command input normalized value Y' representing translation motion and the turn angular velocity $\omega_f$ of the wheelchair 20. However, this method of determination is not limitative; the procedure of Embodiment 1 and the procedure of Embodiment 2 may be changed over for controlling the wheelchair 20. Stated more specifically, the manipulation unit 25 is provided with a switch. Also provided is a changeover command unit for detecting the position of the switch. When the switch is in a first position, the procedure of Embodiment 1 is performed, while when the switch is in a second position, the procedure of Embodiment 2 is performed. Even in this case, the procedure to be performed by the velocity command value calculating unit 120 is the procedure of Embodiment 1 or that of Embodiment 2 depending on the position of the switch, so that the conditions to be judged and involved in the control program per se can be diminished. Further in this case, the procedure can be changed over for use depending on the situation, e.g., depending on whether the properties of the vehicle to advance straight is to be assured preferentially or the quick turnability of the vehicle is to be ensured preferentially. This renders the vehicle more convenient to use.

With the foregoing embodiments, the joystick 25a is used to give command values (with respect to the y-direction and x-direction) for translation motion and turning motion, whereas these command value may be obtained by other input means, e.g., a track pad. Alternatively usable is input means for obtaining command values individually for translation and turning, for example, input means comprising in combination a steering member for commanding turning motion and accelerator for commanding translation motion.

While the foregoing embodiments have been described with reference to the wheelchair 20 serving as an electrically movable vehicle, also usable as electrically movable vehicles are, for example, electrically movable tricycles, electrically movable golf carts and electrically movable carriers.

Apparently, the present invention can be altered or modified by one skilled in the art without departing from the spirit of the invention. Such modifications are included within the scope of the invention as set forth in the appended claims.

What is claimed is:

1. An electrically movable vehicle comprising:
   wheel drive means for driving left and right wheels of the vehicle independently of each other,
   a command value input unit for obtaining a translation command value and a turning motion command value,
   a velocity command value calculating unit for calculating a translation velocity command value and a turn angular velocity command value at the center of gravity of the vehicle, and
   a control command value calculating unit for calculating control values for controlling the wheel drive means for the left and right wheels corresponding to the translation velocity command value and the turn angular velocity command value calculated by the velocity command value calculating unit,
   wherein the velocity command value calculating unit determines the translation velocity command value from only the translation motion command value obtained by the input unit, and determines the turning motion velocity command value from both the turning motion command value obtained by the input unit and a detected translation velocity.

2. The electrically movable vehicle according to claim 1, wherein which is characterized in that the vehicle has a changeover unit,
   the velocity command value calculating unit being operable in response to a signal from the changeover unit.

3. The electrically movable vehicle according to claim 1 wherein the vehicle has a lag element for receiving as an input the command value output from the command value input unit and outputting a command value to the velocity command value calculating unit.

4. The electrically movable vehicle according to claim 1 wherein the wheel drive means controls the rotation of the left and right wheels reversibly with command values which are different in polarity.

5. The electrically movable vehicle according to claim 2, wherein the vehicle has a lag element for receiving as an input the command value output from the command value input unit and outputting a command value to the velocity command value calculating unit.

6. The electrically movable vehicle according to claim 2, wherein the wheel drive means controls the rotation of the left and right wheels reversibly with command values which are different in polarity.

7. The electrically movable vehicle according to claim 3, wherein the wheel drive means controls the rotation of the left and right wheels reversibly with command values which are different in polarity.

8. The electrically movable vehicle according to claim 4, wherein the wheel drive means controls the rotation of the left and right wheels reversibly with command values which are different in polarity.

9. The electrically movable vehicle according to claim 5, wherein the wheel drive means controls the rotation of the left and right wheels reversibly with command values which are different in polarity.

10. A control program for driving an electrically movable vehicle comprising:
    a velocity command value calculating unit for calculating a translation velocity command value and a turn angular velocity command value at a center of gravity, and
    a control command value calculating unit for calculating control values for controlling wheel drive means for driving left and right wheels of the vehicle independently of each other corresponding to the translation velocity command value and the turn angular velocity command value calculated by the velocity command value calculating unit, to drive the wheel drive means,
    wherein the velocity command value calculating unit determines the translation velocity command value from only the translation motion command value obtained by the input unit, and determines the turning motion velocity command value from both the turning motion command value obtained by the input unit and a detected translation velocity.

11. An electrically movable vehicle comprising:
    wheel drive means for driving left and right wheels of the vehicle independently of each other,
    a command value input unit for obtaining a translation motion command value and a turning motion command value,
    a velocity command value calculating unit for calculating a translation velocity command value and a turn angular velocity command value at the center of gravity of the vehicle, and
    a control command value calculating unit for calculating control values and for controlling the wheel drive means for the left and right wheels corresponding to the translation velocity command value and the turn angular velocity command value calculated by the velocity command value calculating unit,
    wherein the velocity command value calculating unit determines the turning velocity command value from only the turning motion command value obtained by the input unit, and determines the translation velocity command value from both the translation motion command value obtained by the input unit and from a detected turning motion velocity.

12. The electrically movable vehicle according to claim 11,
    wherein the vehicle has a changeover unit, the velocity command value calculating unit being operable in response to a signal from the changeover unit.

13. The electrically movable vehicle according to claim 11, wherein the vehicle has a lag element for receiving as an input the command value output from the command value input unit and outputting a command value to the velocity command value calculating unit.

14. The electrically movable vehicle according to claim 11, wherein the wheel drive means controls the rotation of the left and right wheels reversibly with command values which are different in polarity.

15. The electrically movable vehicle according to claim 12, wherein the vehicle has a lag element for receiving as an input the command value output from the command value input unit and outputting a command value to the velocity command value calculating unit.

16. The electrically movable vehicle according to claim 12, wherein the wheel drive means controls the rotation of the left and right wheels reversibly with command values which are different in polarity.

17. The electrically movable vehicle according to claim 13, wherein the wheel drive means controls the rotation of the left and right wheels reversibly with command values which are different in polarity.

18. The electrically movable vehicle according to claim 15, the wheel drive means controls the rotation of the left and right wheels reversibly with command values which are different in polarity.

19. A control program for driving an electrically movable vehicle comprising:

a velocity command value calculating unit for calculating a translation velocity command value and a turn angular velocity command value at a center of gravity, and a control command value calculating unit for calculating control values and for controlling wheel drive means for driving left and right wheels of the vehicle independently of each other corresponding to the translation velocity command value and the turn angular velocity command value calculated by the velocity command value calculating unit, to drive the wheel drive means, wherein the velocity command value calculating unit determines the turning velocity command value from only a turning motion command value obtained by the input unit, and determines the translation velocity command value from both a translation command value obtained by the input unit and from a detected turning motion velocity.

* * * * *